(12) United States Patent
Ishiyama et al.

(10) Patent No.: US 8,490,667 B2
(45) Date of Patent: Jul. 23, 2013

(54) PNEUMATIC TIRE

(75) Inventors: Makoto Ishiyama, Kodaira (JP); Masafumi Koide, Hidaka (JP)

(73) Assignee: Bridgestone Corporation, Tokyo (JP)

( * ) Notice: Subject to any disclaimer, the term of this patent is extended or adjusted under 35 U.S.C. 154(b) by 252 days.

(21) Appl. No.: 12/863,649

(22) PCT Filed: Jan. 24, 2008

(86) PCT No.: PCT/JP2008/051006
§ 371 (c)(1), (2), (4) Date: Jul. 20, 2010

(87) PCT Pub. No.: WO2009/093325
PCT Pub. Date: Jul. 30, 2009

(65) Prior Publication Data
US 2010/0282391 A1 Nov. 11, 2010

(51) Int. Cl.
*B60C 9/18* (2006.01)
*B60C 9/20* (2006.01)
*B60C 9/22* (2006.01)

(52) U.S. Cl.
USPC ........... 152/526; 152/527; 152/531; 152/532; 152/535

(58) Field of Classification Search
USPC .................................................. 152/526–538
IPC .................................................. B60C 9/00,9/18
See application file for complete search history.

(56) References Cited

U.S. PATENT DOCUMENTS

| | | | |
|---|---|---|---|
| 3,310,094 A | 3/1967 | Prevost | |
| 3,543,828 A | 12/1970 | Caille et al. | |
| 3,786,851 A * | 1/1974 | Mirtain et al. | 152/527 |
| 3,982,580 A | 9/1976 | Inoue et al. | |
| 5,565,047 A * | 10/1996 | Tanaka | 152/454 |
| 6,073,668 A * | 6/2000 | Iwasaki et al. | 152/209.14 |
| 6,167,932 B1 * | 1/2001 | Yamamoto et al. | 152/209.14 |
| 2003/0084978 A1* | 5/2003 | Canevini et al. | 152/454 |
| 2003/0102067 A1 | 6/2003 | Okamoto et al. | |
| 2008/0041512 A1* | 2/2008 | Kawai et al. | 152/527 |
| 2009/0032156 A1* | 2/2009 | Stewart | 152/198 |

FOREIGN PATENT DOCUMENTS

| | | |
|---|---|---|
| EP | 0 551 829 A1 | 7/1993 |
| JP | 7009814 A | 1/1995 |
| JP | 7-156612 A | 6/1995 |
| JP | 9-163435 A | 6/1997 |

(Continued)

OTHER PUBLICATIONS

Aoki, Chieko Machine Translation of JP 07-156612 A (No Date).*
International Search Report dated Mar. 4, 2008 (4 pages).

(Continued)

*Primary Examiner* — Justin Fischer
*Assistant Examiner* — Kendra Shin
(74) *Attorney, Agent, or Firm* — Sughrue Mion, PLLC

(57) ABSTRACT

Driving stability and durability is efficiently improved.

Since a protecting layer 43 embedded with reinforcing cords 41 is disposed between a tread 35 and a belt reinforcing layer 31, both of the protecting layer 43 and the belt reinforcing layer 31 decentrally bear a large bending force generated when a pneumatic tire 11 runs on a sharp projection or a difference in level. As a result, even if reinforcing elements 33 in the belt reinforcing layer 31 are extended by large tension due to fill internal pressure, increase of strain generated in the reinforcing elements 33 can be effectively suppressed.

8 Claims, 2 Drawing Sheets

FOREIGN PATENT DOCUMENTS

| | | | |
|---|---|---|---|
| JP | 2000-153702 | A | 6/2000 |
| JP | 2001-010307 | A | 1/2001 |
| JP | 2001-180225 | A | 7/2001 |
| JP | 2002-046415 | A | 2/2002 |
| JP | 2003-87840 | A | 3/2003 |
| JP | 2003-517963 | A | 6/2003 |
| JP | 2004-356993 | A | 12/2004 |
| JP | 2006-213257 | A | 8/2006 |
| JP | 2007-326518 | A | 12/2007 |
| WO | 01/45966 | A1 | 6/2001 |

OTHER PUBLICATIONS

Extended European Search Report dated Dec. 1, 2011 issued in European Application No. 08703833.7 (6 pages).

Japanese Office Action dated Oct. 18, 2011 issued in Japanese Application No. 2007-089084 with English translation (5 pages).

Japanese Office Action issued in Japanese Application No. 2009-524830 dated Apr. 24, 2012.

Korean Office Action issued in Application No. 10-2010-7018630 dated Sep. 27, 2012.

* cited by examiner

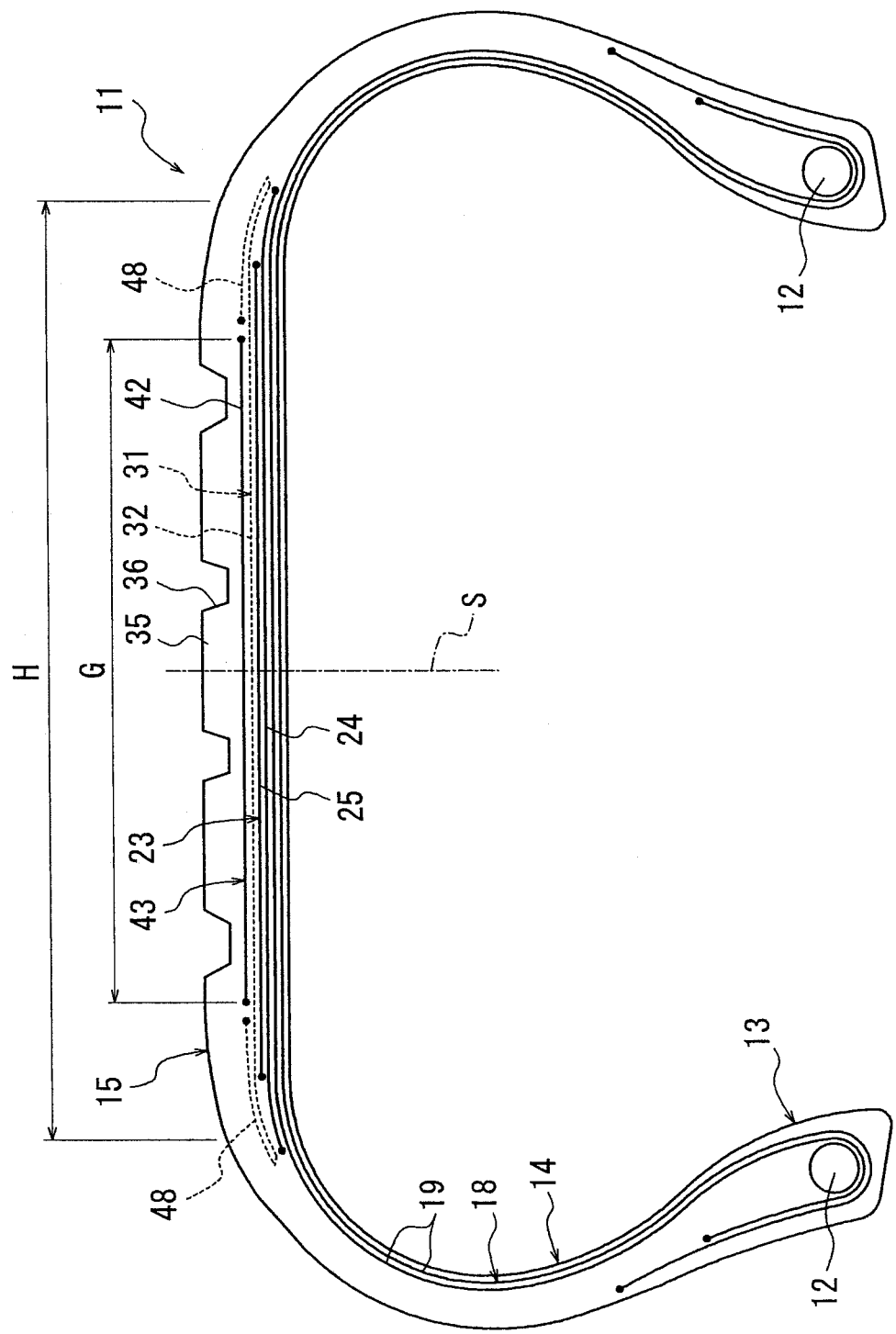

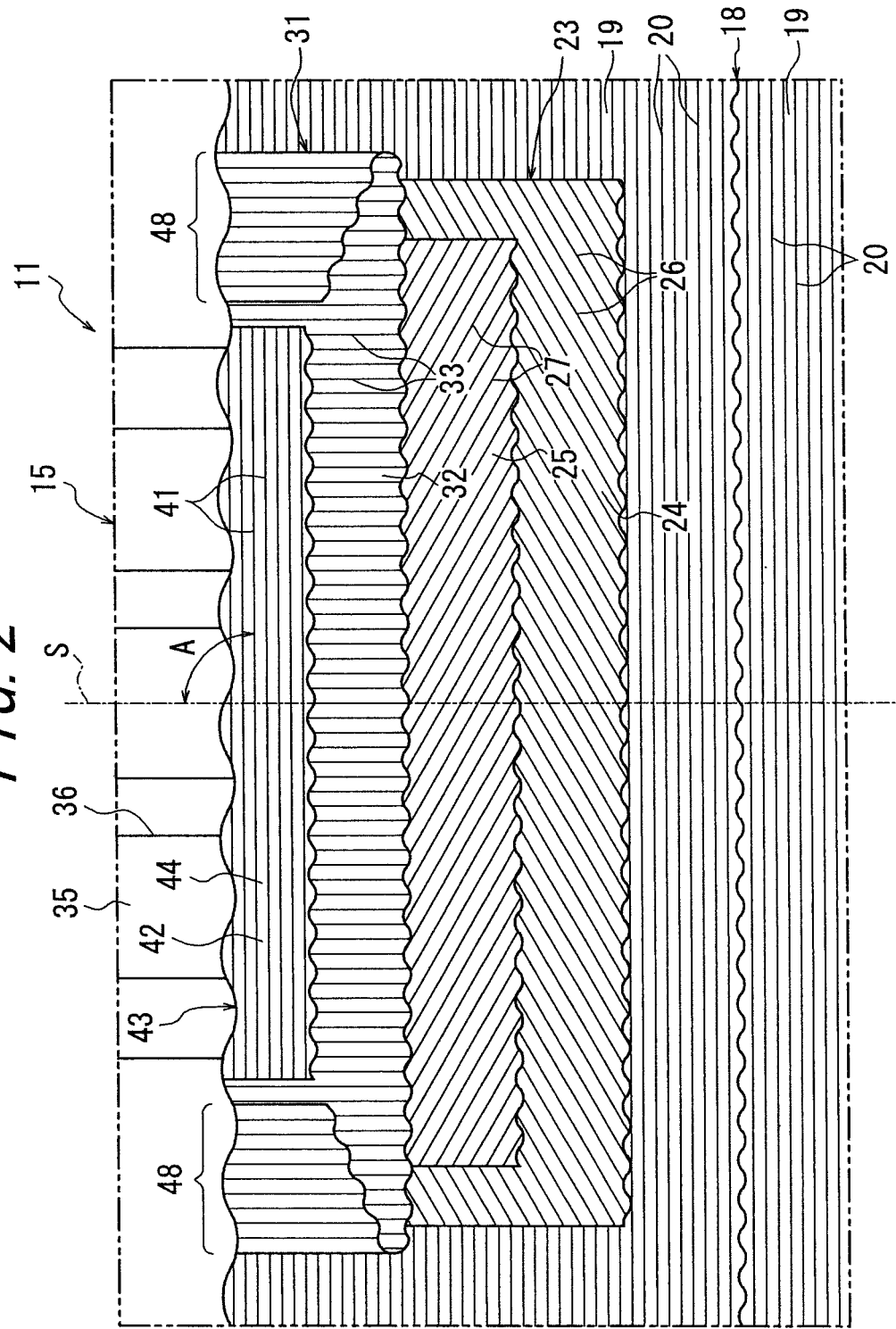

PNEUMATIC TIRE

TECHNICAL FIELD

The present invention relates to a pneumatic tire comprising a belt reinforcing layer embedded with reinforcing elements extending substantially parallel to a tire equator.

RELATED ART

A conventional pneumatic tire described, for example, in JP2002-046415 is known.

This pneumatic tire comprises a carcass layer substantially toroidally extending between a pair of bead cores with its widthwise end portions being turned around the respective bead cores to be anchored, a belt layer disposed on a radially outer side of the carcass layer and consisting of two belt plies which are embedded with metal belt cords inclined at an angle from 15 degrees to 35 degrees and arranged in mutually opposite directions with respect to a tire equator between the two belt plies, a belt reinforcing layer disposed on a radially outer side of the belt layer and embedded with reinforcing elements extending substantially parallel to the tire equator and composed of organic fiber, and a tread disposed on a radially outer side of the belt reinforcing layer.

In the above-mentioned tire the reinforcing elements extending substantially parallel to the tire equator in the belt reinforcing layer can suppress radial expansion of the tread portion of the pneumatic tire for a high-performance car, a truck, a bus and the like toward the radially outer side due to centrifugal force during high-speed running, thereby reducing heating and strain in the widthwise outer ends of the belt layer to improve high-speed durability and driving stability.

DISCLOSURE OF THE INVENTION

However, in the above-mentioned conventional pneumatic tire the reinforcing elements in the belt reinforcing layer extend substantially parallel to the tire equator to hold the pneumatic tire like a hoop so that this belt reinforcing layer bears most of tension in the circumferential direction due to fill internal pressure, especially when the belt cords in the belt layer are inclined at not less than 45 degrees with respect to the tire equator. In this way, when the reinforcing elements are extended by large tension, if the pneumatic tire runs on a sharp projection or a difference in level, the reinforcing elements momentarily receives a large bending force. Therefore, in the end of wear of the tire, it is likely that the projection will come in direct contact with the reinforcing elements and that tensile strain will be generated.

In order to solve such problems, it is conceivable that two-layered belt reinforcing layers are used or the thread density of the reinforcing element is increased to improve durability. However, if the pneumatic tire is so configured, the frame member increases its bending stiffness and a ground contact area during running is reduced, thereby reducing driving stability. In addition, it is also conceivable that cushioning rubber is provided between the tread and the belt layer. However, this is not realistic due to increase of the tire weight.

The present invention aims to provide a pneumatic tire capable of efficiently improving durability as well as maintaining driving stability.

This object can be achieved by a pneumatic tire comprising a carcass layer substantially toroidally extending between a pair of bead cores with its widthwise end portions being anchored by the respective bead cores, a belt layer disposed on a radially outer side of the carcass layer and including at least two belt plies embedded with belt cords inclined with respect to a tire equator, a belt reinforcing layer disposed on a radially outer side of the belt layer and embedded with reinforcing elements extending substantially parallel to the tire equator, and a tread disposed on a radially outer side of the belt reinforcing layer, wherein a protecting layer embedded with reinforcing cords inclined at an angle from 45 degrees to 90 degrees with respect to the tire equator and coated with coating rubber having a larger modulus elasticity than that of rubber constituting the tread is disposed between the tread and the belt reinforcing layer in direct and close contact with the belt reinforcing layer.

In this invention, since the protecting layer embedded with the reinforcing cords is disposed between the tread and the belt reinforcing layer, both of the protecting layer and the belt reinforcing layer decentrally bear a large bending force generated when the pneumatic tire runs on a sharp projection or a difference in level. As a result, in the end of wear of the tire, even if the reinforcing elements in the belt reinforcing layer are extended by large tension due to fill internal pressure, it can be effectively suppressed that further tensile strain is generated in the reinforcing elements. In this way, durability of the tire can be improved.

Besides, since the coating rubber of the above-mentioned protecting layer has larger elasticity than that of the rubber constituting the tread, strain generated in the protecting layer when the tire runs on a sharp projection or the like is smaller than that generated in the tread. As a result, the coating rubber of the protecting layer is prevented from deteriorating and the protecting layer can maintain the above-mentioned protection function for a long term.

If a rubber layer is disposed between the protecting layer and the belt reinforcing layer, when the tire runs on a sharp projection or the like, the protecting layer is easily deformed to increase strain in the protecting layer. However, if the protecting layer is disposed in direct and close contact with the belt reinforcing layer as described above, it is possible to prevent increase of such strain and also to maintain a protection function of the protecting layer for a long term.

In addition, since the reinforcing cords embedded in the protecting layer are inclined at an angle from 45 degrees to 90 degrees with respect to the tire equator, the protecting layer can easily extend in the circumferential direction and effectively suppress increase of out-plane bending stiffness of the tread portion in the circumferential direction, whereby a necessary ground contact area can be easily obtained and driving stability can be maintained at a high level.

The pneumatic tire configured according to claim 2 can sufficiently suppress further tensile strain easily generated in the reinforcing elements of the tread central portion as well as strain in the width direction in the both widthwise ends of the protecting layer.

As described in claim 3, if the reinforcing cords of the protecting layer are composed of organic fiber having low specific gravity, it is possible to reduce the weight of the pneumatic tire and to obtain high driving stability.

The pneumatic tire configured according to claim 4 can effectively suppress separation in the both widthwise ends of the protecting layer and strongly suppress further tensile strain easily generated in the reinforcing elements in the belt reinforcing layer.

The pneumatic tire configured according to claim 5 can suppress failures generated in the both widthwise ends of the belt reinforcing layer and prevent unnecessary weight increase.

The pneumatic tire configured according to claim 6 can attain reduction in weight and easily achieve both of durability and driving stability.

The pneumatic tire configured according to claim 7 can relax shear strain in the circumferential direction generated between a road surface and the outermost belt layer, suppress slipping in this area, equalize a tangential force of the tread in the width direction and improve traction characteristics.

The pneumatic tire configured according to claim 8 can suppress compressive strain generated in the belt layer in the width direction when the tire contacts a road surface.

The pneumatic tire configured according to claim 9 can improve durability of the cords against compressive strain. In addition, the radially outermost belt ply of the belt layer may use organic fiber cords.

The pneumatic tire configured according to claim 10 can relax shear strain generated between a road surface and the outermost belt layer and compressive strain applied in the cords.

BEST MODE FOR CARRYING OUT THE INVENTION

Hereinafter, the first embodiment of the present invention will be described with reference to the drawings.

In FIGS. 1 and 2, the reference numeral 11 denotes a pneumatic tire to be mounted on a high-performance car, a truck, a bus or the like. This pneumatic tire 11 comprises a pair of bead portions 13 respectively embedded with bead cores 12, side wall portions 14 respectively extending from these bead portions 13 toward the radially outer direction, a substantially cylindrical tread portion 15 coupling each of the radially outer ends of the side wall portions 14.

This pneumatic tire 11 comprises a carcass layer 18 toroidally extending between the bead cores 12 to reinforce the side wall portions 14 and the tread portion 15. The both widthwise end portions of this carcass layer 18 are turned around the bead cores 12 from the inner side to the outer side respectively to be anchored by these bead cores 12. The both widthwise end portions of the carcass layer 18 may be respectively sandwiched by halved bead cores from the both sides in the axial direction or respectively adhered to one side surface of the bead cores with high hardness rubber to be anchored by the pair of bead cores.

The carcass layer 18 consists of at least one carcass ply, two carcass plies 19 in this embodiment. Each of the carcass plies 19 is embedded with a plurality of linear carcass cords 20 which are arranged parallel to each other and composed of nylon, aromatic polyamide, steel and the like (nylon in this embodiment). In addition, the carcass cords 20 are inclined at an angle from not less than 45 degrees and less than 90 degrees with respect to the tire equator S in mutually opposite directions between the carcass plies 19 or extend at 90 degrees with respect to the tire equator S, that is, in the radial direction (meridian direction).

The reference numeral 23 denotes a belt layer disposed on the radially outer side of the carcass layer 18. This belt layer 23 is so configured that at least two belt plies, two belt plies 24, 25 in this embodiment are layered in this order towards the radially outer side. Each of the belt plies 24, 25 is embedded with a plurality of non-extensible belt cords 26, 27 linearly extending and arranged parallel to each other. These belt cords 26, 27 are composed of twisted cords of steel, aromatic polyamide and the like or monofilaments. The belt cords 26, 27 in these belt plies 24, 25 are inclined preferably at a cord angle in the range from not less than 45 degrees to less than 90 degrees with respect to the tire equator S and the belt cords in at least two belt plies are arranged in the opposite directions with respect to the tire equator S to intersect with each other.

The belt cords 26, 27 respectively embedded in the belt plies 24, 25 preferably have an inclination angle of not less than 45 degrees and less than 90 degrees with respect to the tire equator. Because, the belt cords 26, 27 having the above-mentioned cord angle can relax shear strain in the circumferential direction generated between a road surface and the outermost belt layer, suppress slipping in this area, equalize a tangential force of the tread in the width direction so as to improve traction characteristics.

In this case, it is effective that the belt cords 27 in the belt ply 25 in the radially outer side have a smaller inclination angle than that of the belt cords 26 in the remaining belt ply 24 in order to suppress compressive strain applied to the belt cords 27 in the radially outer side and to improve durability of the cords disposed in this area.

The belt cords 27 in the belt ply 25 preferably uses a different cord type, such as different twisting structure or different material of cord filament or the like, from that of the belt cords 26 in the belt ply 24. In other words, since the belt cords 27 in the radially outer side are easily subjected to compressive strain, it is recommended in the belt cords 27 to increase the twisting number per unit length or to use organic fiber resistant to compression in order to improve durability of the cords.

In addition, in case that the belt cords 26, 27 respectively embedded in the belt plies 24, 25 have an inclination angle of not less than 45 degrees and less than 90 degrees with respect to the tire equator, the belt becomes flat to be easily subject to compressive strain in the width direction of the belt when the tire contacts the ground. In this context, if the crown portion of the tread 35 has a larger curvature, the above-mentioned compressive strain becomes larger. Therefore, it is advantageous for reduction of compressive strain that the crown portion of the tread 35 has a radius of curvature of not less than 750 mm in the state that the tire 11 is mounted on an applicable rim and filled with air at specific internal pressure. It is preferable that the crown portion of the tread 35 has a radius of curvature of not more than 5000 mm since, when the radius of curvature exceeds 5000 mm, the shape of the crown portion in contacting the ground is distorted likely to cause reduction of driving stability. In addition, the crown portion of the tread 35 more preferably has a radius of curvature within the range between 1500 mm and 4000 mm.

The reference numeral 31 denotes a belt reinforcing layer disposed on the radially outer side of the belt layer 23 in such a manner that the belt reinforcing layer 31 overlaps with the belt layer 23. This belt reinforcing layer 31 consists of a reinforcing ply 32. The belt reinforcing layer 31 overlaps with at least both widthwise end portions of the belt layer 23. In this embodiment the belt reinforcing layer 31 has a slightly wider width than that of the belt layer 23 to overlap with the full width of the belt layer 23. In addition, this belt reinforcing layer 31 preferably has the width of a range between 90% and 110% of the tread width H in order to improve durability in the widthwise outer ends of the belt reinforcing layer 31 and to effectively suppress radial expansion of the tread portion 15.

The above-mentioned belt reinforcing layer 31 (the reinforcing ply 32) is embedded with reinforcing elements 33 extending substantially parallel to the tire equator S and consisting of cords formed by twisting steel or organic fiber (for example, nylon and aromatic polyamide). These reinforcing elements 33 preferably consist of organic fiber among the above-mentioned cords since it is possible to easily achieve both of durability and driving stability as well as weight reduction. Furthermore, this reinforcing elements 33 more preferably consist of non-extensible aromatic polyamide which is superior in heat resistance.

In this way, when the belt reinforcing layer 31 embedded with reinforcing elements 33 extending substantially parallel to the tire equator S covers almost the full width of the belt layer 23 from the radially outer side of the belt layer 23, the tread portion 15 is strongly restrained from being radially expanded toward the radially outer direction due to a centrifugal force during high-speed running, thereby easily capable of maintaining driving stability of the tire at a high level. The above-mentioned belt reinforcing layer 31 may be formed by spirally winding a strip in the outer side of the carcass layer 18, the strip having a constant width and made of one or a few rubber-coated reinforcing elements 33 arranged in parallel to each other. If the belt reinforcing layer 31 is formed in this way, the belt reinforcing layer 31 can be formed with high efficiency and accuracy.

The reference numeral 35 denotes a tread comprising rubber and disposed on the radially outer side of the belt reinforcing layer 31. In order to improve drainage performance, a plurality of main grooves, four main grooves 36 in this embodiment having a wide width and continuously extending in the circumferential direction are formed on the outer surface of this tread 35. A plurality of lateral grooves extending in the width direction or in the inclined direction may be formed on the outer surface of the tread 35. It is noted that such main grooves and lateral grooves are not formed in most racing tires.

In the pneumatic tire 11 provided with such belt reinforcing layer 31, the above-mentioned tensile strain generated in the reinforcing elements 33 in the belt reinforcing layer 31, which are frame members of the outermost layer, when the tire runs on a projection or the like is transmitted to the adjacent reinforcing elements 33, whereby strain of the belt reinforcing layer 31 in the width direction may be increased. Therefore, in this embodiment a thin-walled protecting layer 43 consisting of a protecting ply 42 embedded with reinforcing cords 41 is disposed between the tread 35 and the belt reinforcing layer 31.

In this way, a large bending force generated when the pneumatic tire 11 runs on a sharp projection or a difference in level in the end of wear of the tire is decentrally applied to both of the protecting layer 43 and the belt reinforcing layer 31. As a result, even if the reinforcing elements 33 in the belt reinforcing layer 31 are extended by large tension due to fill internal pressure, a bending force applied to the reinforcing elements 33 is reduced so as that durability of the reinforcing elements 33 can be improved. In this way, durability can be improved.

Besides, since the coating rubber 44 coating the reinforcing cords 41 in the above-mentioned protecting layer 43 has larger elasticity than that of the rubber constituting the tread 35, strain generated in the protecting layer 43 when the tire runs on a sharp projection or the like becomes smaller than that generated in the tread 35. As a result, the coating rubber of the protecting layer 43 is prevented from deteriorating and the protecting layer can maintain the above-mentioned protection function for a long term. The above-mentioned setting is preferable since, when the coating rubber 44 has smaller elasticity than that of the rubber of the tread 35, the coating rubber 44 deteriorates more rapidly than the rubber of the tread 35, whereby strain generated in the protecting layer 43 may be large.

As mentioned above, in case that the coating rubber 44 has larger elasticity than that of the rubber of the tread 35, if the tire continues running in the state that the tread 35 is completely worn out, the coating rubber 44 having high hardness is exposed and contacts a road surface so that a grip force of the pneumatic tire 11 is significantly reduced and a driver will notice such abnormality. As a result, it is possible to prevent the belt reinforcing layer 31 from being craped off by a road surface. The above-mentioned elasticity is obtained by measuring tensile stress (MPa) at the time of 50% extension with a JIS dumbbell shaped test piece 3 at the examination temperature of 30 degrees C. in accordance with JIS K 6251. The larger this elasticity becomes, the larger JIS hardness becomes in general.

If a rubber layer is disposed between the protecting layer 43 and the belt reinforcing layer 31, when the tire runs on a sharp projection or the like, the protecting layer follow the above-mentioned rubber layer and is easily deformed to increase strain in the protecting layer 43. However, if the protecting layer 31 is disposed in direct and close contact with the belt reinforcing layer 43 as described above, it is possible to prevent increase of such strain and also to maintain a protection function of the protecting layer 43 for a long term.

In addition, since in this embodiment the reinforcing cords 41 embedded in the protecting layer 43 are inclined at an angle from 45 degrees to 90 degrees with respect to the tire equator S, the coating rubber 44 between the reinforcing cords 41 extends in the circumferential direction so that the protecting layer 43 can easily extend in the circumferential direction and effectively suppress increase out-plane bending stiffness of the tread portion 15 in the circumferential direction. As a result, a ground contact area required during running can be easily obtained and driving stability can be maintained at a high level.

In addition, when the inclination angle A of the reinforcing cords 41 with respect to the tire equator S is less than 45 degrees, the reinforcing cords 41 themselves come to suppress extension in the circumferential direction so that out-plane bending stiffness of the tread portion 15 in the circumferential direction is increased, thereby reducing the ground contact length and deteriorating driving stability. Therefore, the inclination angle A cannot be set less than 45 degrees. In addition, the above-mentioned inclination angle A is preferably within a range between 70 degrees and 90 degrees in that driving stability can be surely maintained at a high level and more preferably within a range between 85 degrees and 90 degrees.

The above-mentioned protecting layer 43 is preferably disposed in such a manner that the widthwise center of the protecting layer 43 agrees with the tire equator S and the width G of the protecting layer 43 is within a range between 30% and 95% of the width H of the tread. In case that the widthwise center of the protecting layer 43 agrees with the tire equator S as mentioned above, it is possible to sufficiently suppress further tensile strain easily generated in the reinforcing elements 33 of the tread central portion.

When the width G of the protecting layer 43 is less than 30% of the tread width H, it is not possible to sufficiently suppress further tensile strain easily generated in the reinforcing elements 33 of the tread central portion. On the other hand, when the width G of the protecting layer 43 is more than 95% of the tread width H, it is likely to increase strain in the width direction in the both widthwise ends (cut edges) of the protecting layer 43 (reinforcing cords 41). Therefore, since the width G is set within the above-mentioned range, it is possible to sufficiently suppress further tensile strain easily generated in the reinforcing elements 33 of the tread central portion and to suppress strain in the width direction in the both widthwise ends of the protecting layer 43.

In this specification the tread width H indicates the maximum ground contact width measured in such a condition that the tire is mounted on a standard rim specified by the standard such as TRA, ETRTO, JATMA and the like, air pressure corresponding to the maximum load of a wheel in the application size specified in the standard is applied as internal pressure and the maximum load of a wheel in the application size specified in the standard is applied.

The reinforcing cords 41 embedded in the protecting layer 43 may be composed of cords formed by twisting steel or organic fiber such as nylon, aromatic polyamide and the like and preferably composed of organic fiber. This is because, if the reinforcing cords 41 of the protecting layer 43 are composed of organic fiber having low specific gravity, the pneumatic tire 11 can reduce its weight and obtain high driving stability.

The reinforcing cords 41 embedded in the protecting layer 43 preferably have the diameter within a range between 0.5 mm and 2.0 mm. When the diameter of the reinforcing cords 41 is less than 0.5 mm, tensile strain in the reinforcing element 33 of the belt reinforcing layer 31 may be increased. On the other hand, when the diameter is more than 2.0 mm, the cord diameter is so large that widthwise strain in the both widthwise ends (the both widthwise ends of the protecting layer 43), which are cutting edges of the reinforcing cords 41 may be increased. Therefore, since the diameter is set to have the above-mentioned range, it is possible to effectively restrain widthwise strain in the both widthwise ends of the protecting layer 43 and to strongly restrain tensile strain in the reinforcing element 33 of the belt reinforcing layer 31.

Furthermore, since the above-mentioned both widthwise ends of the belt reinforcing layer 31 generates large strain during running, which easily produces heat, in this embodiment the both widthwise ends of the belt reinforcing layer 31 are folded in the radially outer direction to be doubly layered, whereby two-layered portions 48 are respectively formed in the both widthwise ends of the belt reinforcing layer 31. As a result, hoop effect in this portion is increased so as to improve durability in the both widthwise ends of the belt reinforcing layer 31.

The two-layered portions 48 are formed only in the both widthwise ends of the belt reinforcing layer 31 as mentioned above because, if the two-layered portions 48 are disposed across the full width of the belt reinforcing layer 31, the belt reinforcing layer 31 excessively increases its stiffness, decrease the ground contact area and deteriorates driving stability. The two-layered portion 48 may be respectively formed in the both widthwise ends of the belt reinforcing layer 31 by folding one of the both widthwise ends of the belt reinforcing layer 31 in the radially inner direction and the other in the radially outer direction to be doubly layered or by folding the both widthwise ends of the belt reinforcing layer 31 in the radially inner direction to be doubly layered.

In case that the two-layered portions 48 are provided in the belt reinforcing layer 31 as mentioned above, it is preferable that the protecting layer 43 is so disposed as not to overlap with these two-layered portions 48, that is to say, the widthwise outer ends of the protecting layer 43 are disposed widthwise inside of the widthwise inner ends of the two-layered portions 48. Because, the two-layered portions 48 don't have to be protected by the protecting layer 43 since the belt reinforcing layer 31 disposed in the radially outer direction protects the belt reinforcing layer 31 disposed in the radially inner direction and unnecessary weight increase is caused if the two-layered portions 48 overlap with a widely-formed protecting layer 43.

EXAMPLE 1

Hereinafter, the experimental example will be explained. In this experiment, Conventional Tire, in which the protecting layer is removed from the tire shown in FIGS. 1, 2 and Example Tire shown in FIGS. 1, 2 are prepared. Each tire has a tire size of 225/50R16. In each tire, the carcass layer is configured by two layered carcass plies embedded with carcass cords consisting of nylon and inclined at 90 degrees with respect to the tire equator S and the belt layer is configured by two layered belt plies to have the width of 225 mm.

Among the above-mentioned belt plies, the first belt ply disposed in the radially inner side is embedded with belt cords made of steel and upwardly inclined to the right at 60 degrees with respect to the tire equator S, and the second belt ply disposed in the radially outer side is embedded with belt cords made of steel and downwardly inclined to the right at 60 degrees with respect to the tire equator S. In addition, the belt reinforcing layer in each tire consists of a reinforcing ply embedded with reinforcing elements made of aromatic polyamide and extending substantially parallel to the tire equator S and has the width of 235 mm.

The both widthwise ends of the belt reinforcing layer are folded in the radially outer direction to form two-layered portions, each of which has the width of 30 mm. As a result, there is a one-layered portion having the width of 175 mm between the two-layered portions. The above-mentioned belt cord is formed by twisting three steel filaments having the wire diameter of 0.25 mm, and the thread density of such belt cord is 60 cords/50 mm. On the other hand, the reinforcing element is formed by twisting fiber made of aromatic polyamide to have the diameter of 0.7 mm and spirally wound so as to have the thread density of 50 cords/50 mm. In each tire, the gauge of the tread is 9 mm and four main grooves continuously extending in the circumferential direction and having the depth of 7 mm are formed in the outer surface of the tread.

The protecting layer of Example Tire comprises one protecting ply embedded with reinforcing cords made of aromatic polyamide and inclined at 90 degrees with respect to the tire equator S. The width G of the protecting layer is 150 mm (67% of the tread width H), which is narrower than that of the above-mentioned one-layered portion and the widthwise center agrees with the tire equator S. The above-mentioned reinforcing cord is formed by twisting fibers made of aromatic polyamide to have the diameter of 0.8 mm, and the thread density of such reinforcing element is 50 cords/50 mm. In addition, the coating rubber coating the above-mentioned reinforcing cords has one-and-a-half times more elasticity than that of the rubber constituting the tread. The reinforcing cords are coated with such coating rubber so that the protecting layer has the thickness of 1 mm.

In this experiment a steel drum having the diameter of 3 m and the width of 1 m is used. A steel projection of rectangular section extending in the axial direction across the full width of the drum and having the height of 15 mm and the circumferential length of 30 mm is fixed on one location of the outer circumference of such drum. Next, the internal pressure (gauge pressure) of 220 kPa is applied to each tire. While the load of 6 kN is applied, running is started from 100 km/h with slip angle of 0 degree. The speed is increased in increments of 10 km/h every 30 minutes up to 250 km/h.

The results show that there are no defect in appearance in both of Conventional Tire and Example Tire. After the above-mentioned running, each tire is dissected to measure remaining break strength (durability) of the reinforcing element in the belt reinforcing layer. Specifically, one reinforcing element having the length of 200 mm is taken out from the belt reinforcing layer on the tire equator so as not to be hurt. Next, the both ends of this reinforcing element are fixed to be elongated until it is broken and then tensile (break) force at the time of breaking is measured. Assuming that the tensile force in the reinforcing element of Conventional Tire is 100, the tensile force of the reinforcing element of Example Tire is 137, which means that durability of the reinforcing element in Example Tire is improved as compared with that of Conventional Tire.

Instead of the above-mentioned projection, a steel projection having a quadrangular prismatic shape having the height of 15 mm, the circumferential length of 30 mm and the axial length of 30 mm is fixed on one location of the outer circumference of the above-mentioned drum. Next, running of each tire is started under the same condition as the above-mentioned condition, the remaining break strength (durability) at the time of breaking is measured as tensile (break) force like the above-mentioned case. Assuming that the tensile force in the reinforcing element of Conventional Tire is 100, the tensile force of the reinforcing element of Example Tire is 151, and durability of the reinforcing element in Example Tire is improved as compared with that of Conventional Tire. As thus described, it can be understood that large damage is done to the belt reinforcing layer when such a small projection cuts into a part of the tread in the widthwise direction.

Next, each of the above-mentioned tire is mounted on a high-performance car and it runs on a test course. Then, driving stability is evaluated on the basis of an expert driver's feelings. The results show that there are no difference in driving stability between Conventional Tire and Example Tire.

EXAMPLE 2

Test tires (Example Tires 2 to 12 and Comparative Example Tire) having a belt layer whose specifications are shown in Table 1 are produced like Example Tire 1 and the evaluation same as that of Example Tire 1 is performed. The evaluation results are also shown in Table 1.

Durability of the second belt layer is obtained in such a manner that a drum test using a steel drum having the diameter of 3 m and the width of 1 m without providing a projection on the drum is performed and remaining break strength is measured as tensile (break) force at the time of break like the above-mentioned case. The internal pressure (gauge pressure) of 180 kPa is applied to the test tires. While the load of 8 kN is applied, running is started from 100 km/h with slip angle of 0 degree. The speed is increased in increments of 10 km/h every 30 minutes up to 250 km/h. After this run, one cord having the length of 200 mm is taken out from the second belt layer on the tire equator so as not to be hurt. Next, the both ends of this cord are fixed to be elongated until it is broken and then tensile (break) force at the time of breaking is measured. The results are also shown in Table 1 in index values with tensile force of the cord of Conventional Tire being as 100.

TABLE 1

|  | Conventional Example | Example 1 | Example 2 | Example 3 | Example 4 | Example 5 | Example 6 |
|---|---|---|---|---|---|---|---|
| Material of first belt layer 24 | steel | steel | steel | steel | steel | steel | steel |
| Material of second belt layer 25 | steel | steel | steel | steel | steel | steel | steel |
| Material of belt reinforcing layer | aromatic polyamide | aromatic polyamide | aromatic polyamide | aromatic polyamide | aromatic polyamide | aromatic polyamide | aromatic polyamide |
| Material of protecting layer | (Non) | aromatic polyamide | aromatic polyamide | aromatic polyamide | aromatic polyamide | aromatic polyamide | aromatic polyamide |
| Cord angle of first belt layer 24 | 20 degrees | 20 degrees | 20 degrees | 20 degrees | 20 degrees | 20 degrees | 20 degrees |
| Cord angle of second belt layer 25 | 20 degrees | 20 degrees | 20 degrees | 20 degrees | 20 degrees | 20 degrees | 20 degrees |
| Cord angle of belt reinforcing layer | 0 degree | 0 degree | 0 degree | 0 degree | 0 degree | 0 degree | 0 degree |
| Cord angle of protecting layer | (Non) | 90 degrees | 90 degrees | 90 degrees | 90 degrees | 60 degrees | 45 degrees |
| Cord type of first and second belt layers (twisting structure) | same | same | same | same | same | same | same |
| Rubber elasticity of protecting layer (vs. tread) | same | large | large | large | large | large | large |
| Radius of curvature of tread crown portion | 700 mm | 700 mm | 750 mm | 3000 mm | 5000 mm | 3000 mm | 3000 mm |
| Durability of belt reinforcing layer | 100 | 137 | 136 | 135 | 135 | 130 | 125 |
| Durability of second belt layer 25 | 100 | 102 | 102 | 101 | 101 | 100 | 100 |
| Driving stability (index) | 100 | 103 | 105 | 107 | 107 | 105 | 103 |

|  | Example 7 | Example 8 | Example 9 | Example 10 | Example 11 | Example 12 | Comparative Example |
|---|---|---|---|---|---|---|---|
| Material of first belt layer 24 | steel | steel | steel | steel | steel | steel | steel |
| Material of second belt layer 25 | steel | steel | steel | aromatic polyamide | steel | steel | steel |
| Material of belt reinforcing layer | aromatic polyamide | aromatic polyamide | aromatic polyamide | aromatic polyamide | aromatic polyamide | aromatic polyamide | aromatic polyamide |
| Material of protecting layer | aromatic polyamide | aromatic polyamide | aromatic polyamide | aromatic polyamide | aromatic polyamide | aromatic polyamide | aromatic polyamide |

TABLE 1-continued

| | | | | | | | |
|---|---|---|---|---|---|---|---|
| Cord angle of first belt layer 24 | 45 degrees | 70 degrees | 80 degrees | 70 degrees | 70 degrees | 70 degrees | 70 degrees |
| Cord angle of second belt layer 25 | 45 degrees | 70 degrees | 80 degrees | 70 degrees | 45 degrees | 70 degrees | 70 degrees |
| Cord angle of belt reinforcing layer | 0 degree | 0 degree | 0 degree | 0 degree | 0 degree | 0 degree | 0 degree |
| Cord angle of protecting layer | 90 degrees | 90 degrees | 90 degrees | 90 degrees | 90 degrees | 90 degrees | 90 degrees |
| Cord type of first and second belt layers (twisting structure) | same | same | same | same | same | same | same |
| Rubber elasticity of protecting layer (vs. tread) | large | large | large | large | large | large | small |
| Radius of curvature of tread crown portion | 700 mm | 700 mm | 700 mm | 700 mm | 700 mm | 3000 mm | 700 mm |
| Durability of belt reinforcing layer | 121 | 114 | 112 | 113 | 113 | 113 | 95 |
| Durability of second belt layer 25 | 99 | 98 | 98 | 102 | 101 | 101 | 90 |
| Driving stability (index) | 118 | 121 | 115 | 121 | 119 | 120 | 113 |

This invention can be applied to the industrial field of a pneumatic tire.

BRIEF DESCRIPTION OF THE DRAWINGS

FIG. 1 is a cross-sectional view taken along the meridian of a pneumatic tire showing the first embodiment of the present invention.

FIG. 2 is a partial plane-development view of the tire.

DESCRIPTION OF REFERENCE NUMERALS

| | |
|---|---|
| 11 | pneumatic tire |
| 12 | bead core |
| 18 | carcass layer |
| 23 | belt layer |
| 24, 25 | belt ply |
| 26, 27 | belt cord |
| 31 | belt reinforcing layer |
| 33 | reinforcing element |
| 35 | tread |
| 41 | reinforcing cord |
| 43 | protecting layer |
| 44 | coating rubber |
| 48 | two-layered portion |
| S | tire equator |
| G | width |
| H | tread width |

The invention claimed is:

1. A pneumatic tire comprising
a carcass layer substantially toroidally extending between a pair of bead cores with its widthwise end portions being anchored by the respective bead cores,
a belt layer disposed on a raidally outer side of the carcass layer and consisting of at least two belt plies embedded with belt cords inclined with respect to a tire equator,
a belt reinforcing layer disposed on a raidally outer side of the belt layer and embedded with reinforcing elements extending substantially parallel to the tire equator, and
a tread disposed on a radially outer side of the belt reinforcing layer, wherein
a protecting layer embedded with reinforcing cords inclined at an angle from 45 degrees to 90 degrees with respect to the tire equator and coated with coating rubber having larger elasticity than that of rubber constituting the tread is disposed between the tread and the belt reinforcing layer in direct and close contact with the belt reinforcing layer,
wherein the reinforcing cord embedded in the protecting layer is composed of organic fiber, and
wherein a belt cord embedded in a belt ply disposed in a radially outermost side in the belt layer has a twist number per unit length that is larger than that of belt cords embedded in at least one remaining belt ply.

2. The pneumatic tire according to claim 1, wherein a widthwise center of the protecting layer agrees with the tire equator and a width of the protecting layer is within a range between 30% and 95% of a width of the tread.

3. The pneumatic tire according to claim 1, wherein the reinforcing cord embedded in the protecting layer has a diameter within a range between 0.5 mm and 2.0 mm.

4. The pneumatic tire according to claim 1, wherein the belt reinforcing layer has two-layered portions in both widthwise end portions and the widthwise outer ends of the protecting layer are disposed widthwise inside of the widthwise inner ends of the two-layered portions.

5. The pneumatic tire according to claim 1, wherein the reinforcing element embedded in the belt reinforcing layer is composed of organic fiber.

6. The pneumatic tire according to claim 1, wherein the belt cord in the belt layer has an inclination angle of not less than 45 degrees and less than 90 degrees with respect to the tire equator.

7. The pneumatic tire according to claim 1, wherein a crown portion of the tread has a radius of curvature of not less than 750 mm and not more than 5000 mm in a state that the tire is mounted on an applicable rim and filled with air at specific internal pressure.

8. The pneumatic tire according to claim 1, wherein a belt cord embedded in a belt ply disposed in a radially outermost side in the belt layer has a smaller inclination angle than that of belt cords embedded in at least one remaining belt ply.

* * * * *